US011210037B2

(12) United States Patent
Kosann et al.

(10) Patent No.: US 11,210,037 B2
(45) Date of Patent: Dec. 28, 2021

(54) IMAGE SELECTION AND SIZING FOR JEWELRY

(71) Applicant: MRK Fine Arts, LLC, New Canaan, CT (US)

(72) Inventors: Monica Rich Kosann, New Canaan, CT (US); Rod G. Kosann, New Canaan, CT (US); Ashley Kurose, Norwalk, CT (US); Alexi Cassudakis, Norwalk, CT (US); Cathleen Allen, Jacksonville, FL (US)

(73) Assignee: MRK Fine Arts, LLC, New Canaan, CT (US)

( * ) Notice: Subject to any disclaimer, the term of this patent is extended or adjusted under 35 U.S.C. 154(b) by 0 days.

(21) Appl. No.: 16/318,013

(22) PCT Filed: Jul. 5, 2018

(86) PCT No.: PCT/US2018/040844
§ 371 (c)(1),
(2) Date: Jan. 15, 2019

(87) PCT Pub. No.: WO2019/014035
PCT Pub. Date: Jan. 17, 2019

(65) Prior Publication Data
US 2020/0192611 A1 Jun. 18, 2020

Related U.S. Application Data

(60) Provisional application No. 62/553,451, filed on Sep. 1, 2017, provisional application No. 62/532,533, filed on Jul. 14, 2017.

(51) Int. Cl.
*G06F 3/12* (2006.01)
*G06F 16/9535* (2019.01)
(Continued)

(52) U.S. Cl.
CPC .......... *G06F 3/1208* (2013.01); *A44C 25/004* (2013.01); *A44C 27/00* (2013.01);
(Continued)

(58) Field of Classification Search
None
See application file for complete search history.

(56) References Cited

U.S. PATENT DOCUMENTS 10,586,262 B2    3/2020  Scoggins
2011/0307349 A1* 12/2011 Gandhi .............. G06Q 30/0603
                                                 705/26.5
(Continued)

FOREIGN PATENT DOCUMENTS

WO    2009054589 A1    4/2009
WO    2014054947 A1    4/2014

OTHER PUBLICATIONS

International Search Report and Written Opinion of Application No. PCT/US/18/40844 dated Sep. 25, 2018.
(Continued)

*Primary Examiner* — Frantz Bataille
(74) *Attorney, Agent, or Firm* — Gordon & Jacobson, P.C.

(57) ABSTRACT

A method for formatting an image sized for use with jewelry includes selecting a jewelry design from among a plurality of designs, selecting an image for reproduction, editing the selected image to fit in a virtual display frame representative of and corresponding to a physical frame of the selected locket, and generating a cutout layout of the edited image on a printable media of a predetermined size, which when printed, includes a reproduction of the selected image sized to fit the selected jewelry. Selecting an image may include selecting a digital image from a user's social media account. Also, the method may include generating user-directed
(Continued)

queries related to at least one of lifestyle, passions, and interests, receiving responses from the user to the user-directed queries, and based on the received responses, generating suggested indicia for selection by the user.

12 Claims, 13 Drawing Sheets

(51) Int. Cl.
    *G06F 16/9536*     (2019.01)
    *A44C 25/00*     (2006.01)
    *A44C 27/00*     (2006.01)
    *B41J 3/407*     (2006.01)

(52) U.S. Cl.
    CPC ............ *B41J 3/407* (2013.01); *G06F 3/1242* (2013.01); *G06F 16/9535* (2019.01); *G06F 16/9536* (2019.01)

(56) References Cited

U.S. PATENT DOCUMENTS

| | | |
|---|---|---|
| 2015/0055085 A1 | 2/2015 | Fonte et al. |
| 2016/0139761 A1* | 5/2016 | Grosz ................... G06F 3/0482 715/769 |
| 2016/0229196 A1* | 8/2016 | Schifter ............... A44C 25/002 |
| 2016/0247195 A1* | 8/2016 | Hopper ................. G06F 3/1285 |
| 2016/0311241 A1 | 10/2016 | Rosner et al. |
| 2016/0372082 A1 | 12/2016 | Kosann et al. |
| 2017/0099916 A1 | 4/2017 | Burr |

OTHER PUBLICATIONS

EP Supplemental Search Report and Written Opinion dated Mar. 24, 2021 of Application No. 18832924.7.
Chinese Office Action dated Nov. 30, 2020 of patent application No. 201880059705.7.

* cited by examiner

IMAGE SELECTION AND SIZING FOR JEWELRY

CROSS-REFERENCE TO RELATED APPLICATIONS

This application claims priority to U.S. Provisional Patent Application No. 62/532,533, filed Jul. 14, 20017, and to U.S. Provisional Patent Application No. 62/553,451, filed Sep. 1, 2017, the entire contents of each of which are incorporated herein by reference.

BACKGROUND

1. Field

The present disclosure relates to selecting and sizing images for display on or in jewelry, and, more specifically, to methods and systems for selecting and sizing images that may be cut from physical media and attached to jewelry.

2. State of the Art

Traditionally, the practice of putting pictures in a locket has been a cumbersome manual process that remained unchanged for decades. It involved finding a physical photograph that one might want to put into the locket, making copies of that photograph on printed media in various sizes, and then cutting the photograph on the media into what a user estimated was the proper size to fit in the locket. This often required further trimming of the photo to eventually reduce the sizing to fit the frame of the locket.

It would therefore be useful to facilitate the process of image selection and sizing for lockets and other jewelry into which images are framed.

SUMMARY

According to one aspect, further details of which are described herein, a method is provided for selecting, sizing, and laying out an image to fit into a frame of a piece of jewelry. In the specific case of a locket that is configured to display one or more images, the method includes selecting a locket style from a plurality of locket styles, selecting an image (which may be a quotation or other text), editing the selected image to fit in a desired manner in a virtual frame representative of and corresponding to a physical frame of the locket, and generating an image of a cutout layout of the edited images on printable media of a predetermined size. In one embodiment, a user may save, share (e.g., via email, text message, or social media), and/or print the generated cutout layout. If the user prints the cutout layout on media of the predetermined size, the user need only cutout the printed images following the layout and directly transfer the cut images to the frames of the physical locket corresponding to the selected style. Assuming the user cut the images along the lines in the layout, no further trimming should be necessary.

In one embodiment, selecting images includes selecting a digital image from a user's device or account. A user device may include a smartphone, tablet, or personal computer. An account may be a user account of an online photosharing website or a social media platform on which photos are readily accessible to the user. In another embodiment, selecting images includes selecting a digital image from a digital library of images. In one embodiment, selecting images includes a user entering a quotation or other text. In one embodiment, selecting images includes a user selecting a quotation from a digital library of predetermined quotations.

In one embodiment, selecting an image includes generating user-directed queries related to at least one of lifestyle, passions, and interests, and receiving responses from the user to the user-directed queries. Based on the received responses, suggestions are generated for the user for at least one of text and images determined to appeal to the user for possible user selection.

One benefit of the method is that a user can draw from suggested images and text or upload images from image libraries on their own mobile devices or other online libraries and have the images printed in a retail store or elsewhere in the exact size necessary for the frame in a particular locket. Once the correctly sized images are cut, the locket can then be filled with the images. Another benefit is that whatever has been chosen by the user can then be stored and/or shared with friends and family via email, text messages, and social media, including deployed in association with a digital representation of the locket.

DETAILED DESCRIPTION OF THE PREFERRED EMBODIMENTS

Figure 1:
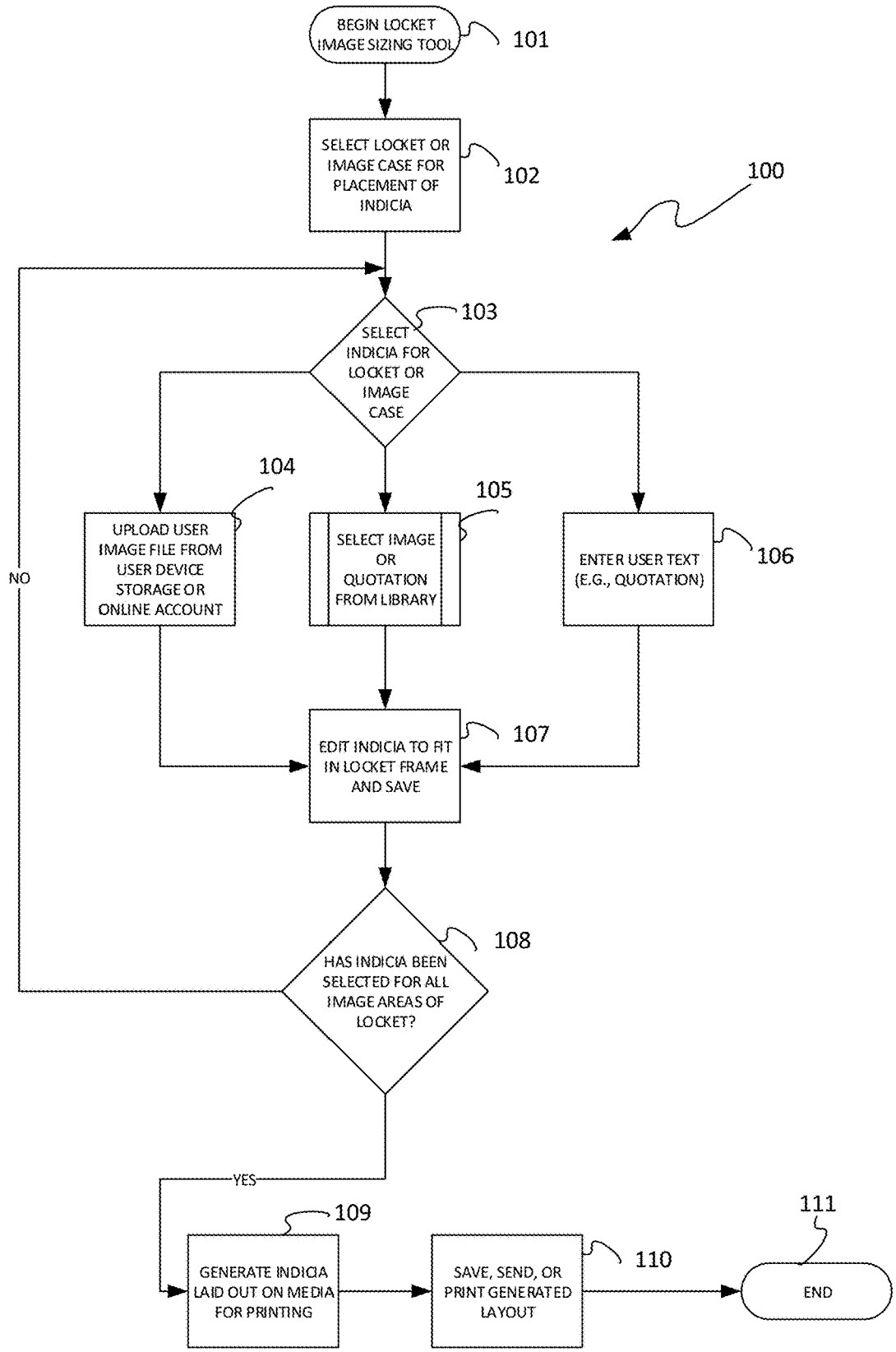
FIG. 1 illustrates an embodiment of a workflow for generating a print layout for indicia for display on a piece of jewelry.
Figure 2:
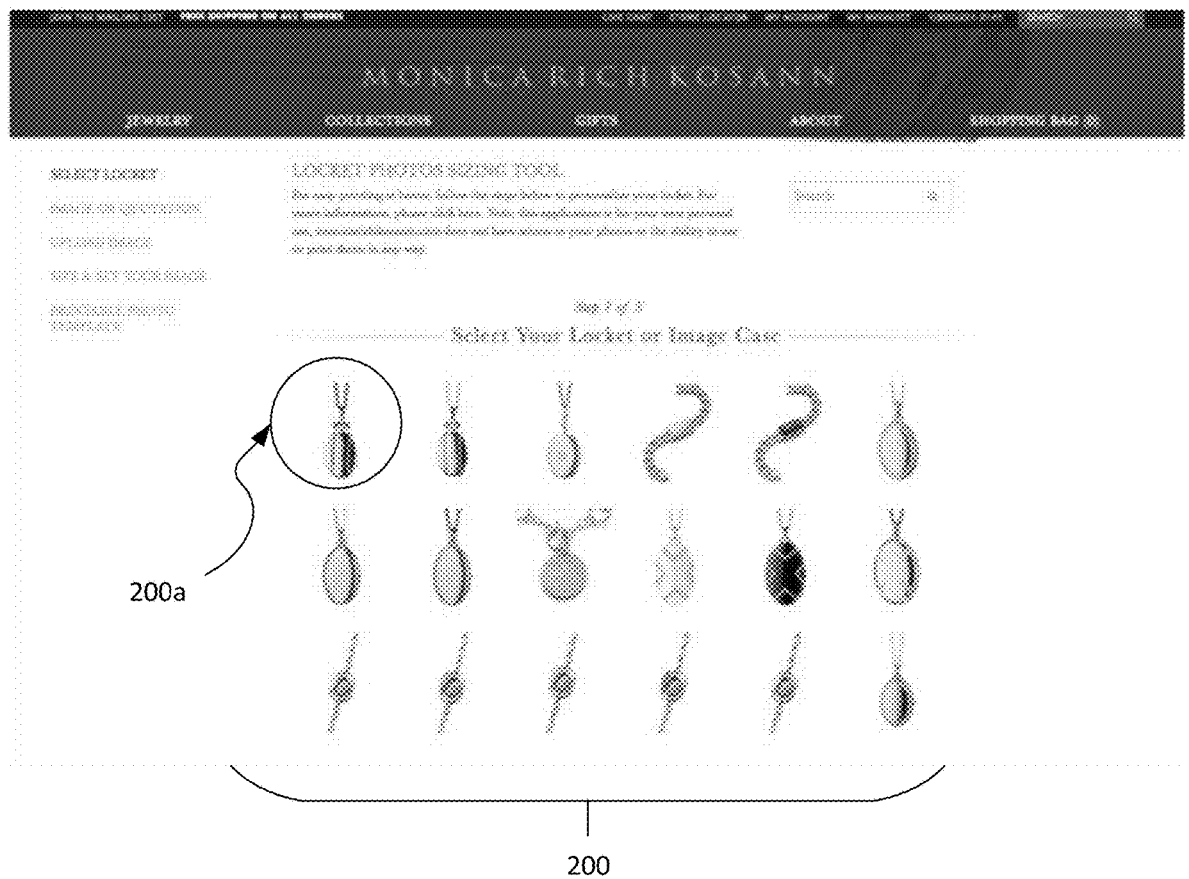
FIG. 2 illustrates a display window for a user to select a locket or image case style in accordance with an embodiment of the disclosure.

FIG. 1 illustrates a workflow 100 in accordance with an aspect of the disclosure. At block 101 an image sizing tool is launched, such as, by way of example, opening a web browser window or computer application, as shown in FIG. 2. At block 102 a user may select one design 200*a* of a plurality of jewelry designs 200 for which they wish to generate a sized image to fit. For example, a user may wish to generate a sized image to fit one of the lockets that they wish to purchase or have already purchased. As used herein, "fit" refers to being sized to be placed in the frame or other display area of a piece of jewelry, such as the frame of the locket 200*a*. At block 103, once the user selects the locket 200*a*, the user selects indicia (e.g., a photo or text) to be sized for the frame(s) of the locket 200*a*. As used herein, "indicia" refers to any markings which may be graphically displayed in a display area (e.g., 302 or 303) of the piece of jewelry (e.g., locket 200*a*), such as a frame of a locket. Thus, indicia may include graphical images such as photos, insignias, logos, astronomical signs, etc., as well as text in various formats and fonts.

Figure 3:
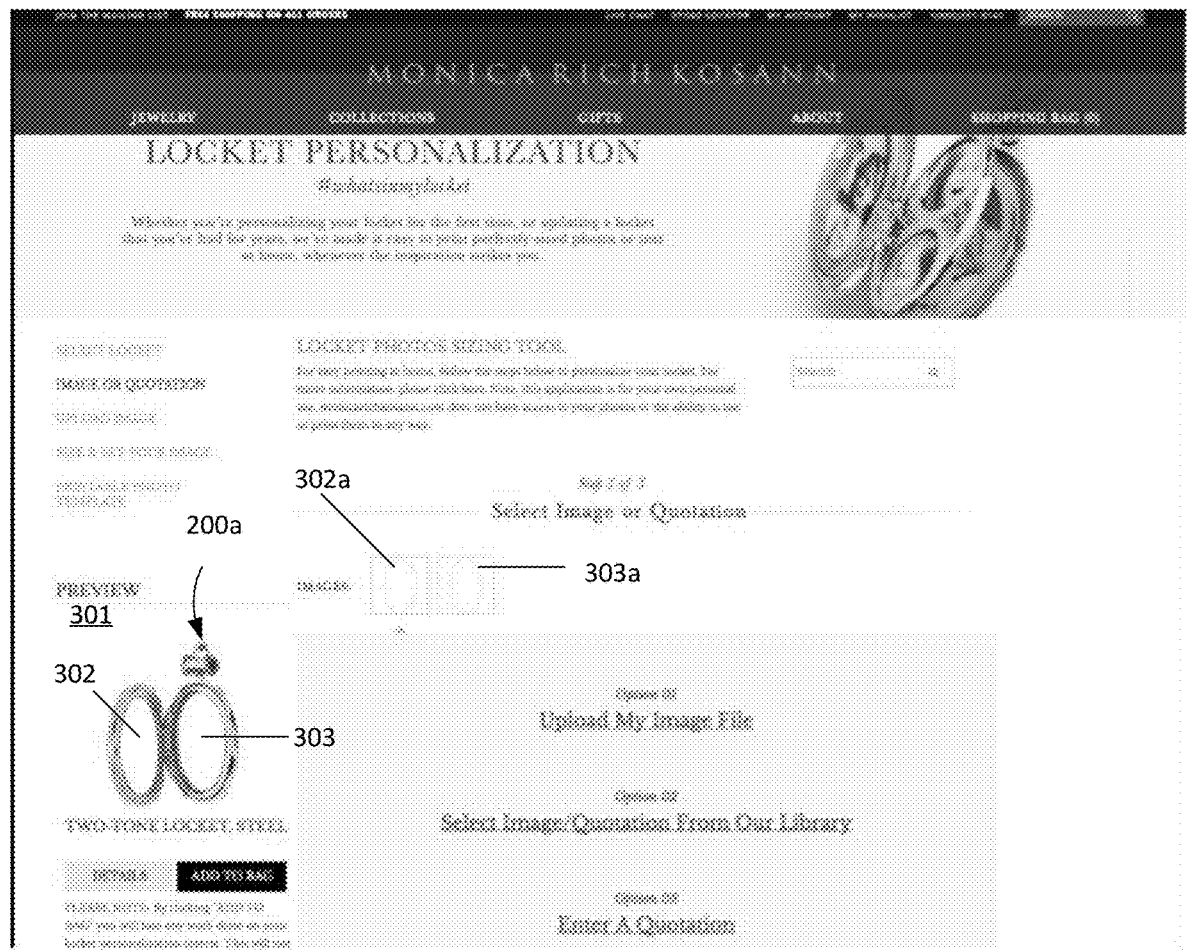
FIG. 3 illustrates a display window for a user to select options for selecting indicia for the jewelry style selected in FIG. 2.

In the example workflow 100 shown in FIG. 1, a plurality of options are available for a user to select indicia. For example, as indicated in FIG. 3, one method denoted as block 104 for selecting indicia is for a user to upload an image from a library of his or her own, which may be an album of digital photos available on a smartphone, tablet, or personal computer of the user, or from an internet account of a user, which may include photo sharing services or social media platforms. Another option for selecting indicia, denoted as block 105, is for a user to select indicia from libraries not under the control or organized by the user, which may online image or text libraries. Yet another option for selecting indicia, denoted as block 106, is for a user to enter their own text, which, as shown in FIG. 3, may be a quotation.

As shown in FIG. 3, once the locket 200*a* is selected, a window 301 is displayed to a user that shows a virtual representation of the selected locket 200*a*, opened to show the frames and the display areas 302 and 303 of the locket for displaying the sized indicia 302*a* and 303*a*. As will be described further below, as the user progresses in selecting indicia to be located in the display areas 302 and 303, a preview window 301 will be updated to reflect the user selections. A user may update his or her selections and go back to change the previewed image of the locket. The number of selected indicia is based on the number of display areas of the locket or jewelry design. For example, locket 200*a* is configured with two frames and, thus, two display areas 302 and 303 are shown in FIG. 3. However, other jewelry designs may include more or fewer number of frames, which would alter the number of corresponding display areas in FIG. 3.

Figure 4:
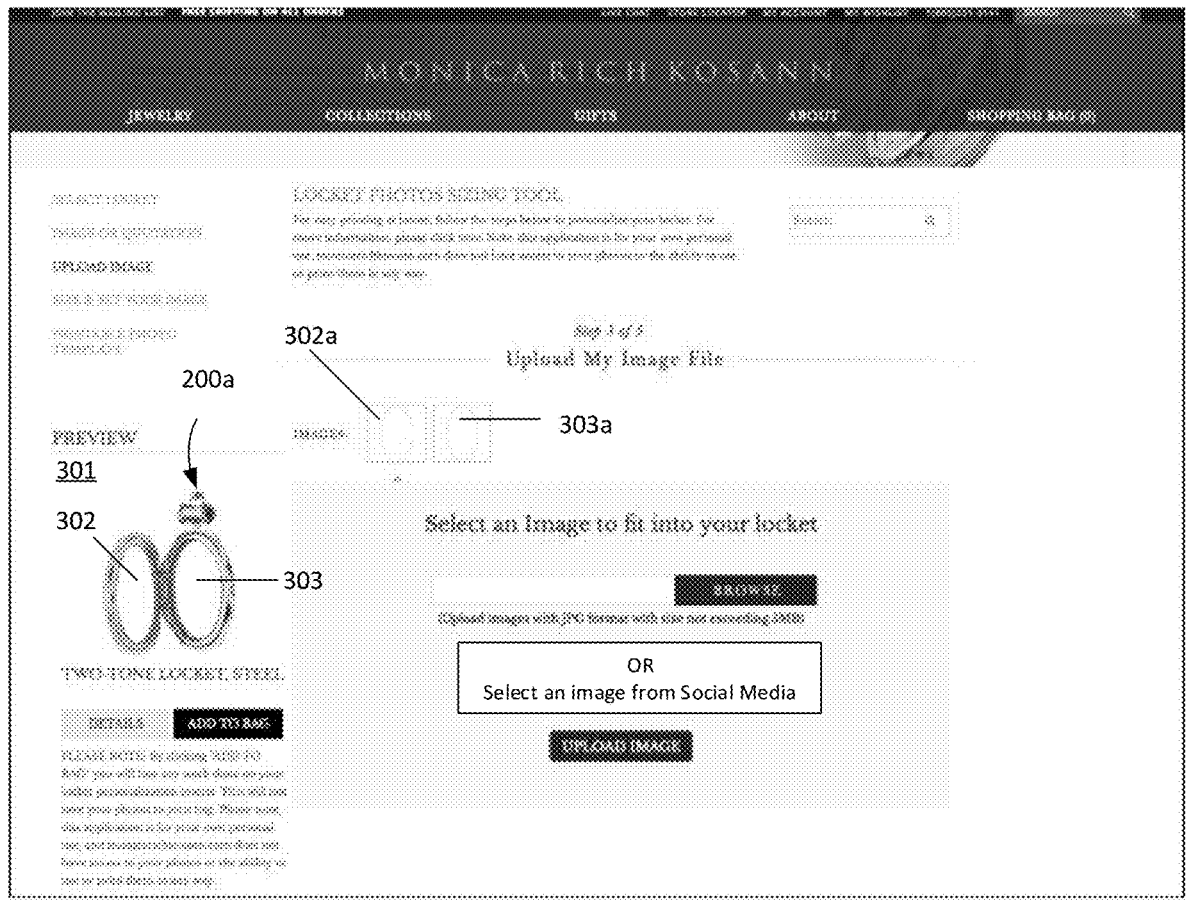
FIG. 4 illustrates a display window for a user to browse to image files located on a user device or in a user account.

FIG. 4 shows a user prompt to browse and upload an image file from their own library, which may be locally stored on a user device or on a networked location, such as a photosharing website or social media platform, such as Facebook® or Instagram®. A user may link an account and navigate to a desired image file and select it as is known in the art.

Figure 5:
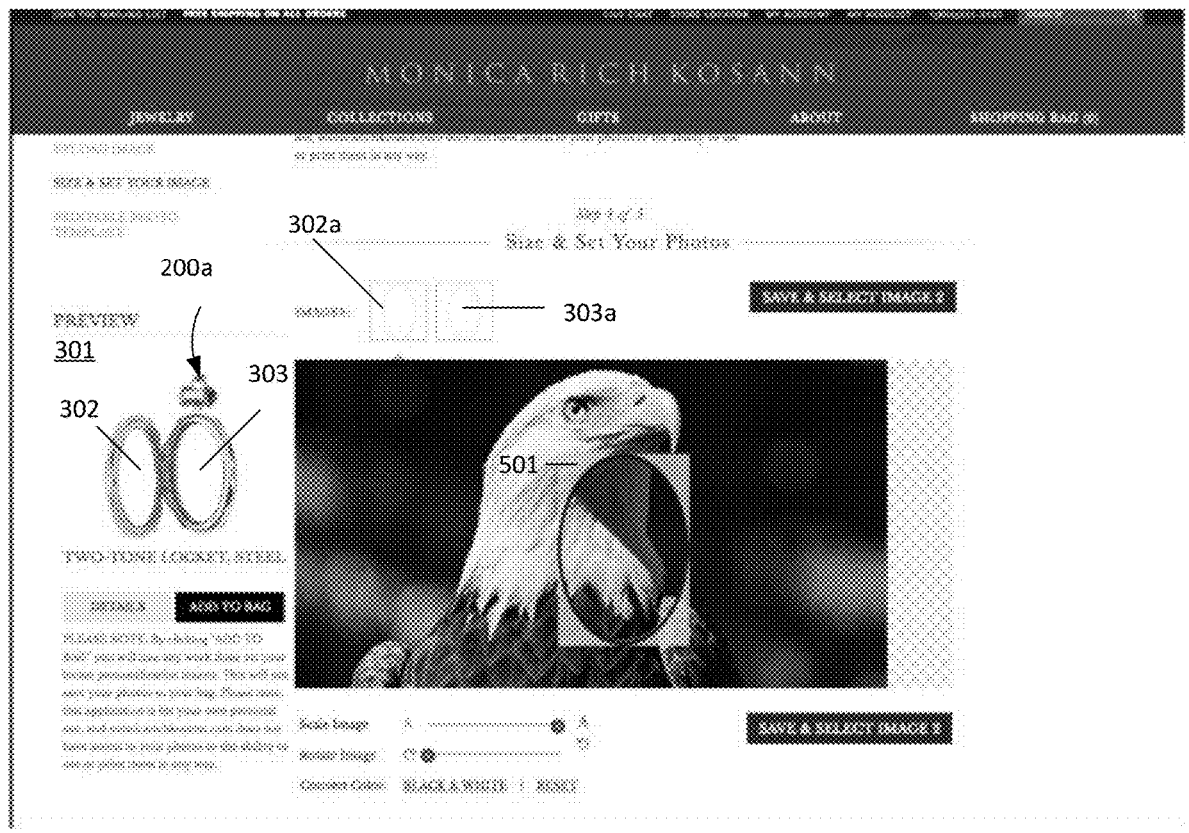
FIGS. 5 and 6 illustrate a display window for a user to edit the image selected in FIG. 4.
Figure 6:
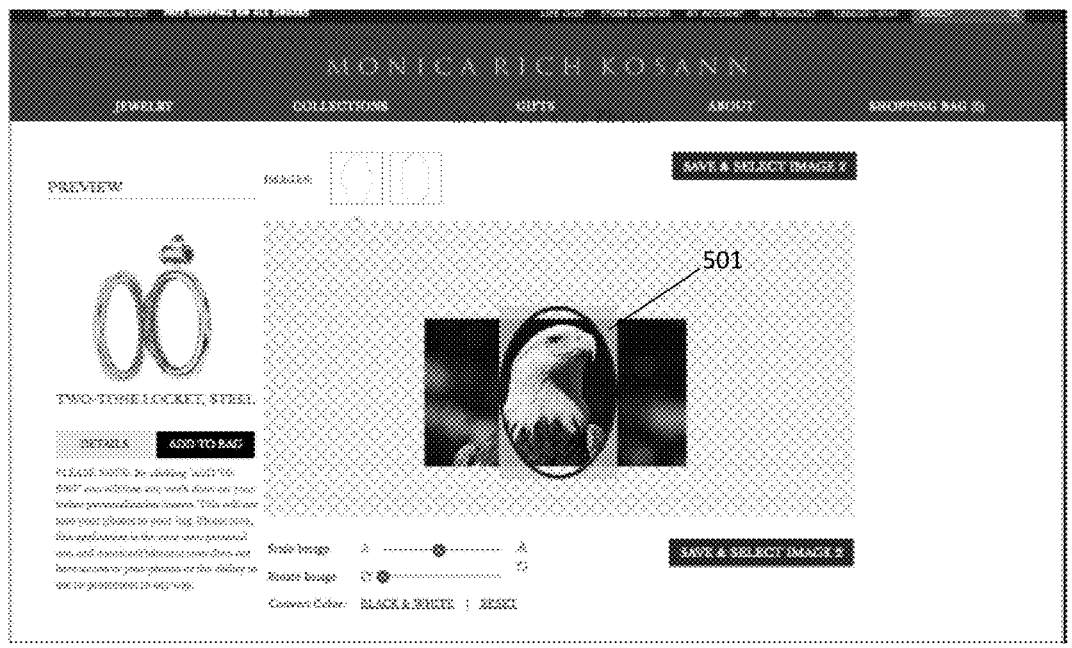

At block 107, a user selecting the image may edit and resize the image. For example, as shown in FIG. 5, upon selecting the user's desired image from his or her own library, the image will be shown with an overlaid stencil 501 which is shaped to be representative of the area 302 of locket 200*a*. Various editing controls are included for a user to scale the image larger or smaller, to rotate the image, and to convert the image from color to black and white and vice versa. In one embodiment where the user is using a touch screen interface, such as on a smart phone or a tablet computer, the user may use gestures to resize the image. For example, a user using a smart phone with a touch interface may use a finger pinching gesture to scale down an image and may use a finger swipe to move the image into alignment with the stencil 501. FIG. 6 shows the result of a user moving the image and resizing the image so that a desired portion of the image is framed by the stencil 501. Once the user is satisfied with the framed image in the stencil, a user may save the image at block 107.

At block 108 a determination is made whether indicia has been selected for all display areas 302 and 303 of the jewelry (e.g., locket 200*a*). If indicia has not been selected for all display areas 302 and 303 of the jewelry (i.e., NO at block 108), then the workflow moves to block 103. Otherwise, the workflow moves to block 109.

Figure 7:
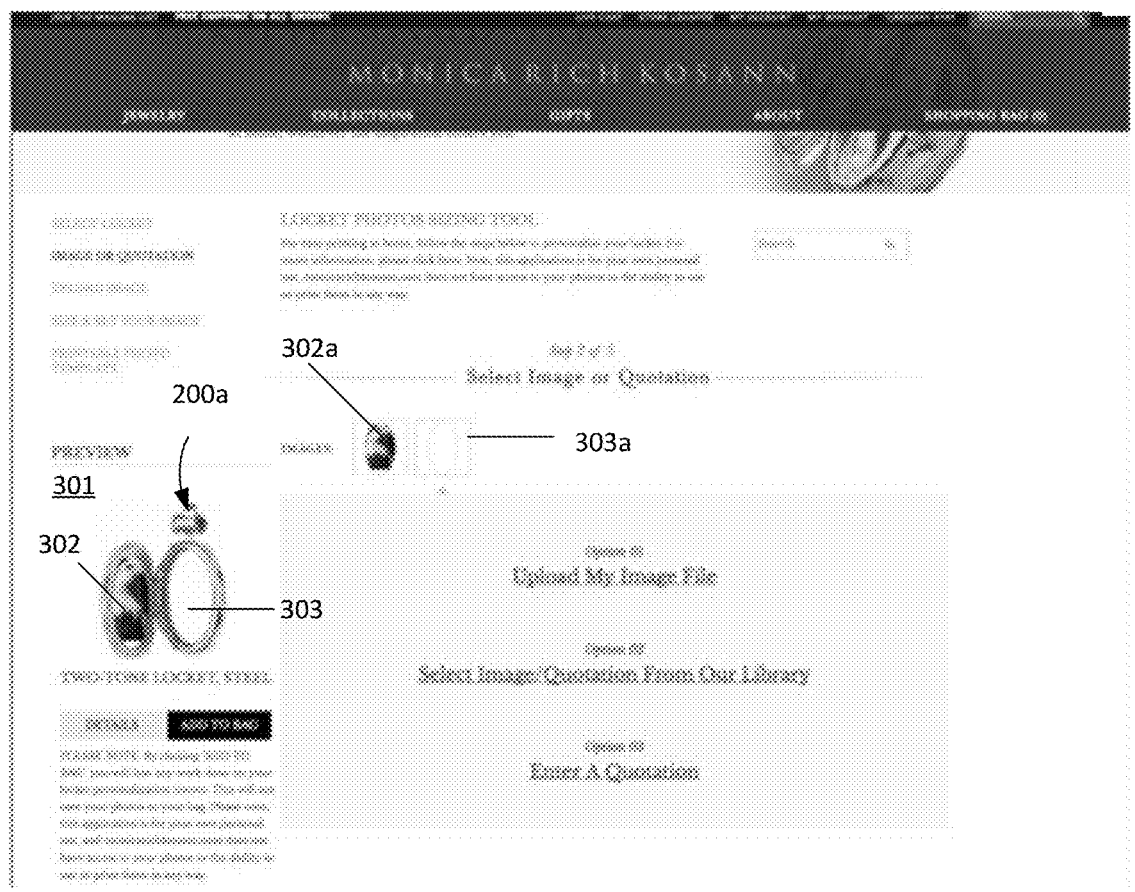
FIG. 7 illustrates the display window of FIG. 3 with the edited image shown in a representation of the locket selected in FIG. 2.
Figure 8:
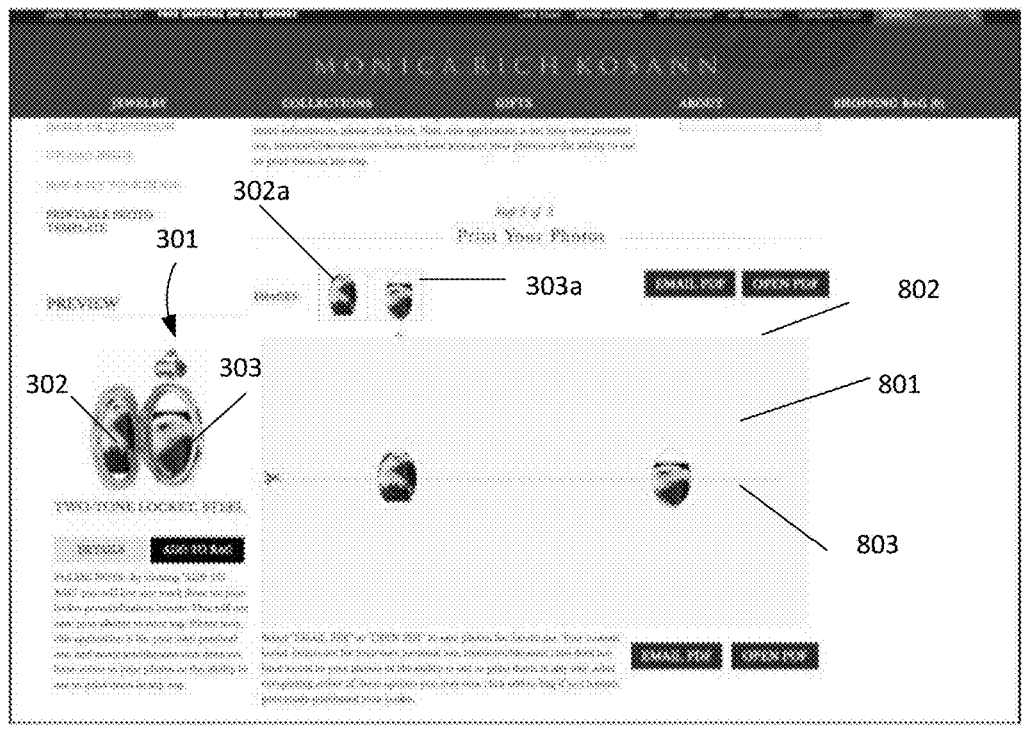
FIG. 8 illustrates a display window showing a print cut layout for two images that have been selected and edited for use with the locket selected in FIG. 2.

In the example described above, the locket 200*a* has two display areas 302 and 303 so the workflow returns to block 103, whereupon a user is presented with the display shown in FIG. 7. As shown in FIG. 7, the image 302*a* saved in block 107 is displayed in display area 302. The user may repeat blocks 104 and 107 and save another image for display in area 303, as shown in FIG. 8. Once both images 302*a* and 303*a* are selected and saved, at block 109 a cutout layout is generated in another region 802 of the display. The cutout layout 801 shows a representation of a printable media (i.e., sheet of paper) overlaid with the saved images 302*a* and 303*a* and broken lines 803 for use as a cutting guide. At block 110, a user may save, share (e.g., via email, text message, or social media), or print the generated cutout layout 801. If the cutout layout 801 is printed on the printable media (e.g., paper) a user can use the printed broken lines as a cutting guide for cutting out the images 302*a* and 303*a*. If the user cuts the images 302*a* and 303*a* along the cutting lines, the images should fit exactly into the frames of the selected locket 200*a* without trimming.

Turning again to block 105, FIG. 9 shows an example of an image gallery window 901 from which a user may select images 903. The user may be able to select from one or more of a plurality of libraries 902 of images 903. The images 903 in the image gallery may be stock images suggested based on data from a user's social media account as described in greater detail below.

In some social media platforms, such as Facebook®, information that the user has already input into their profile may be used to generate suggestions for the images 903. For example, in the case of the Facebook® social media platform, "interest" data may be accessed from the Facebook® profile of the user to generate suggestions for the images 903. In one example, a user may have input "interest" data into their profile, such as interests in skiing and yoga. As a result, the interest data for the user's profile may be used to suggest stock photos related to those interests, skiing and yoga.

Another type of information that the user may have input into Facebook® is "check-in/tagged location" data. For example, when a user posts or otherwise uploads a photo to their social media account, the user may tag the photo by specifying where the photo was taken and the subject or context of the photo. Also, in addition to tagging the photo, image recognition may be used to automatically identify the location of the photo from the context of the photo itself. If, for example, the user has posted a photo and tagged it as having been taken in New York, then the user's Facebook® profile may indicate that the user has visited New York. Accordingly, suggested photos 903 may be generated of New York to aid a user in creating a "Favorite Places" themed photo locket.

Yet another type of data used by some social media platforms is "friend" data, which includes a list of other social media account members who are connected to the user's account. Some social media platforms include relationship information for each "friend" in the friend list to identify the relationship between the user and the "friend". For example, some "friends" may be related by family ties, professional associations, religious association, and by educational affiliation, etc. By way of example to Facebook®, a user may have a plurality of "Facebook® Friends" and the identification of each friend may be used to generate the suggested photos 903 that may facilitate a user's selection of photos for display in a piece of jewelry, e.g., a locket. In one example, a user may wish to give a photo locket to one of their Facebook® friends and use a photo from the user's Facebook photos for personalizing the locket. The user may select the Facebook® friend from the list to be presented with photos from among the user's photos in which the Facebook® friend (the intended gift recipient) is tagged. As an alternative to tagging photos, image recognition may be used to identify friends in the friend list who are in non-tagged photos. In the case of tagged photos, the user can browse through the tagged photos and select any to use for display in the locket gift. Also, the user may select multiple Facebook® friends to be presented with photos in which the multiple friends are tagged. Also, the user can select the user along with one (or more) other Facebook® friend(s) in order to be presented with photos that are tagged with both the user (as the gift giver) and the other Facebook® friend (gift recipient) in order to select a photo for the locket that has both people in the photo.

Figure 9:
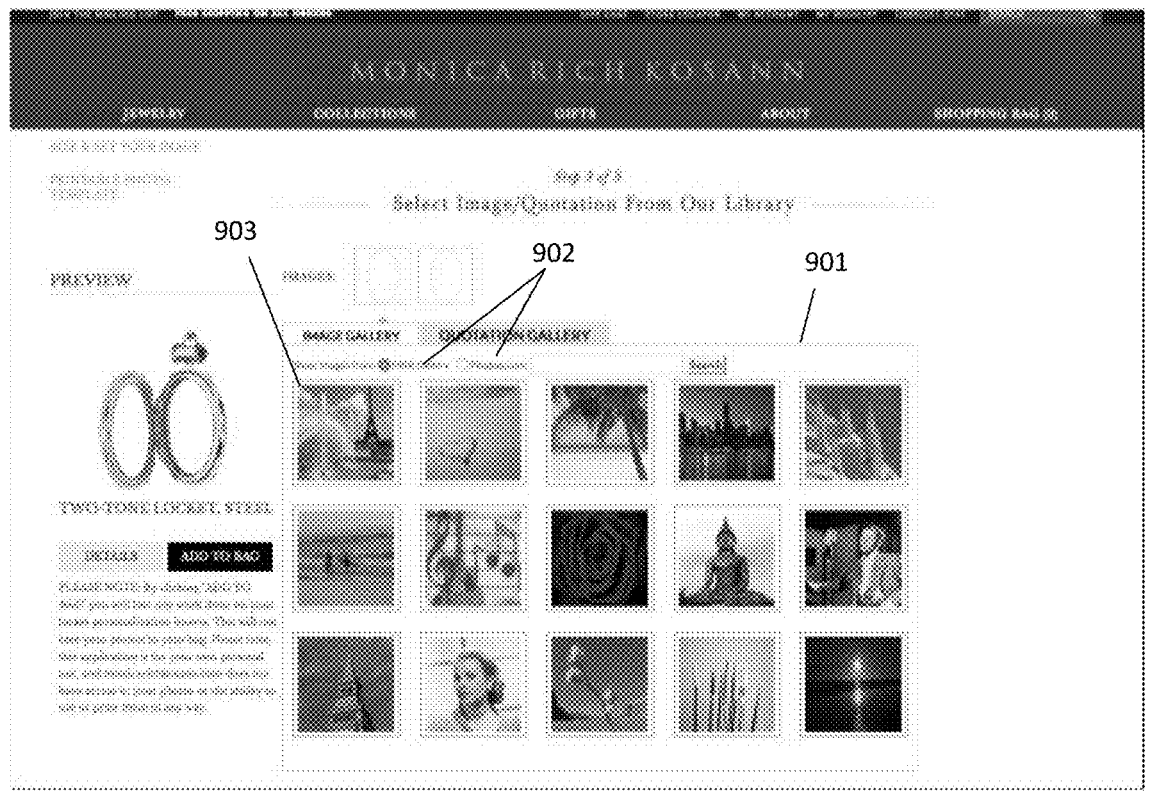
FIG. 9 illustrates a display window for a user to select stock photos from a library of photos.
Figure 10:
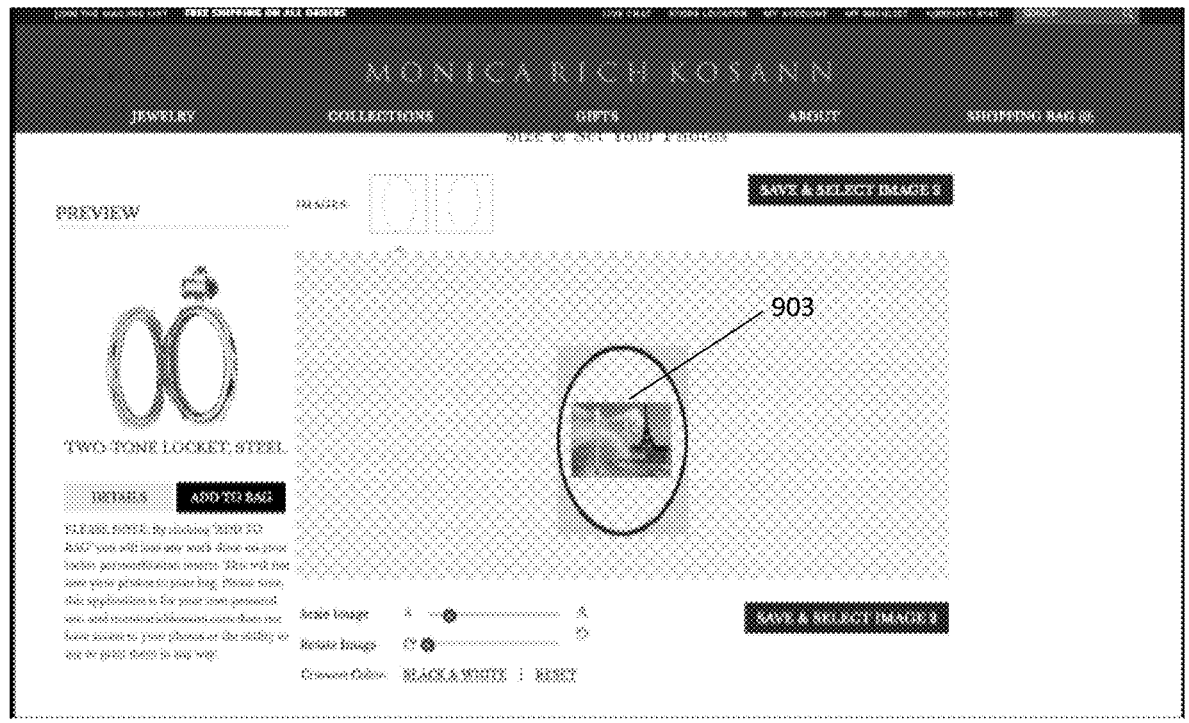
FIG. 10 illustrates a display window for a user to edit a photo selected from the library of FIG. 9.

FIG. 10 illustrates a user selection and editing of one image 903 shown in FIG. 9.

Figure 11:
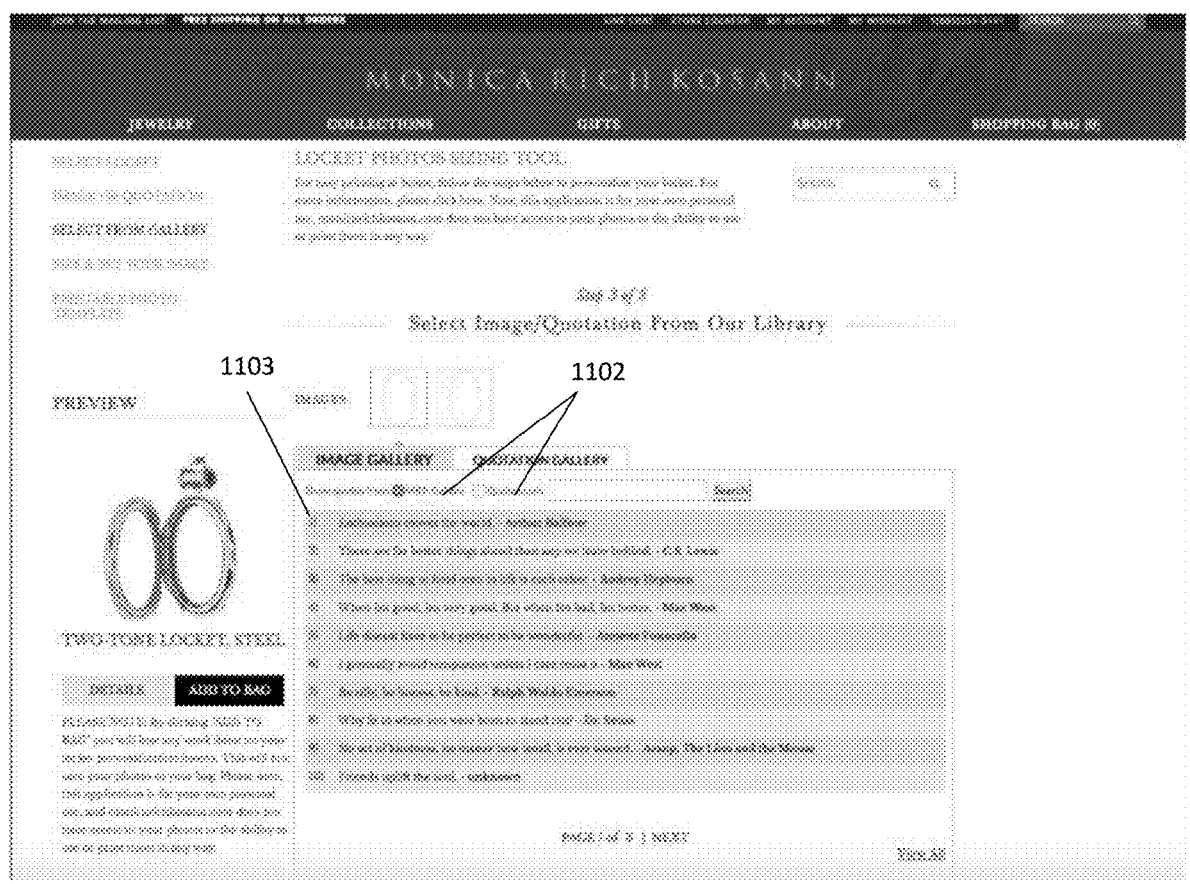
FIG. 11 illustrates a display window for a user to select stock quotations from a library of quotations.
Figure 12:
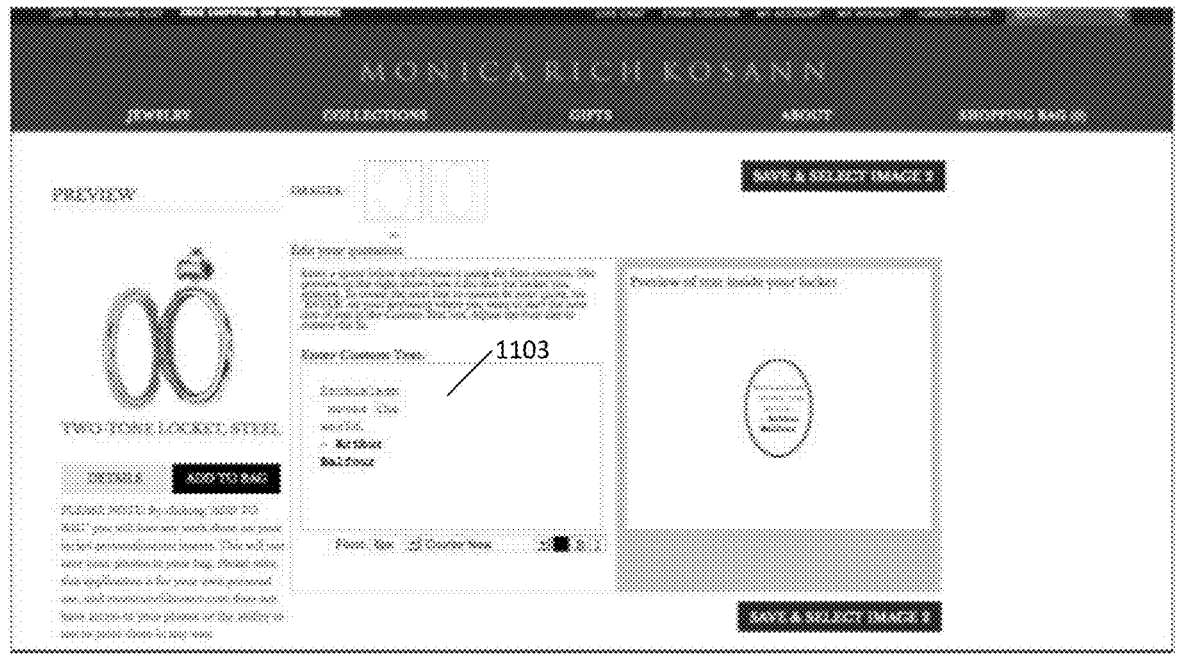
FIG. 12 illustrates a display window for a user to edit a stock quotation selected from the library of FIG. 11.
Figure 16:
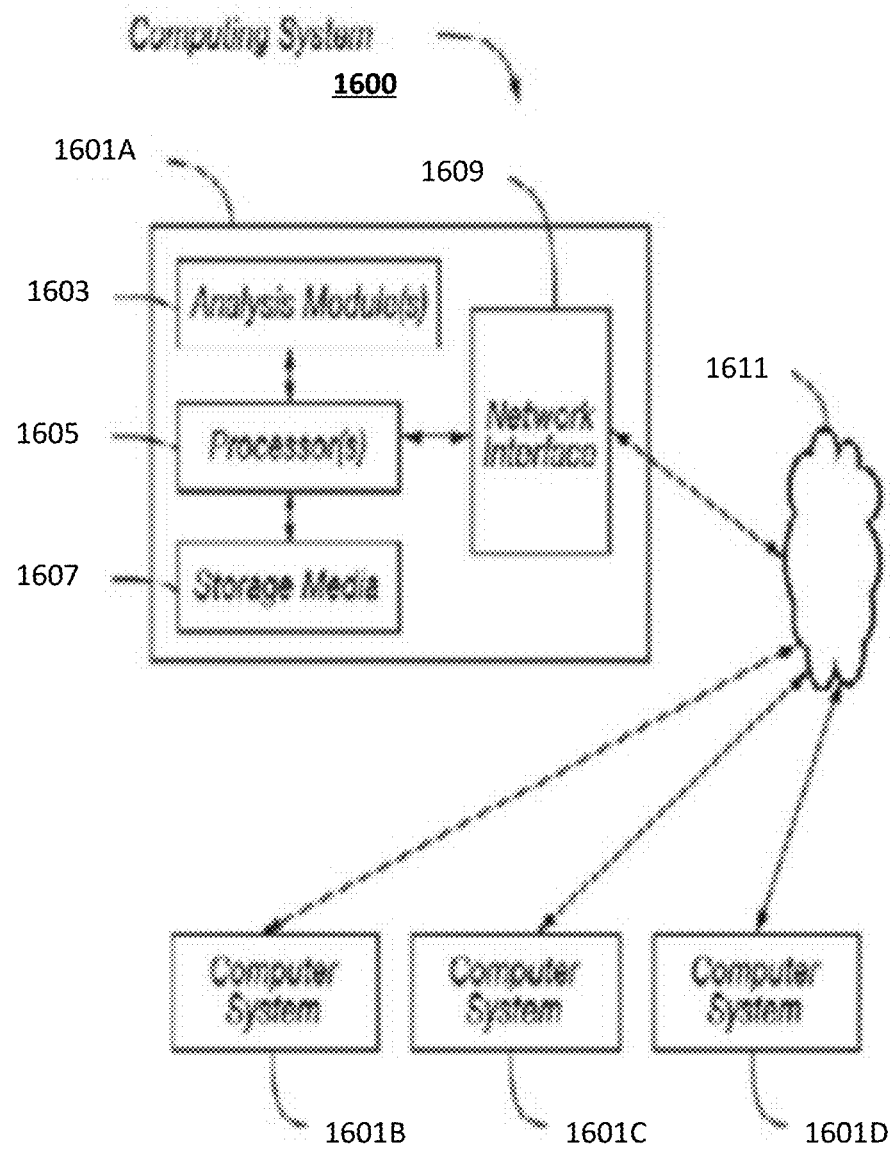
FIG. 16 shows an example computing system that can be used to implement the workflows of FIGS. 1 and 15.

Also, at block 105, as shown in FIG. 11, a user can select quotations from a quotation or text gallery window 1101 for use as indicia in the locket 200a. The user may be able to select from one or more of a plurality of libraries 1102 of quotations or text. FIG. 16 illustrates a user selection and editing of one quotation 1103 shown in FIG. 11.

Figure 13:
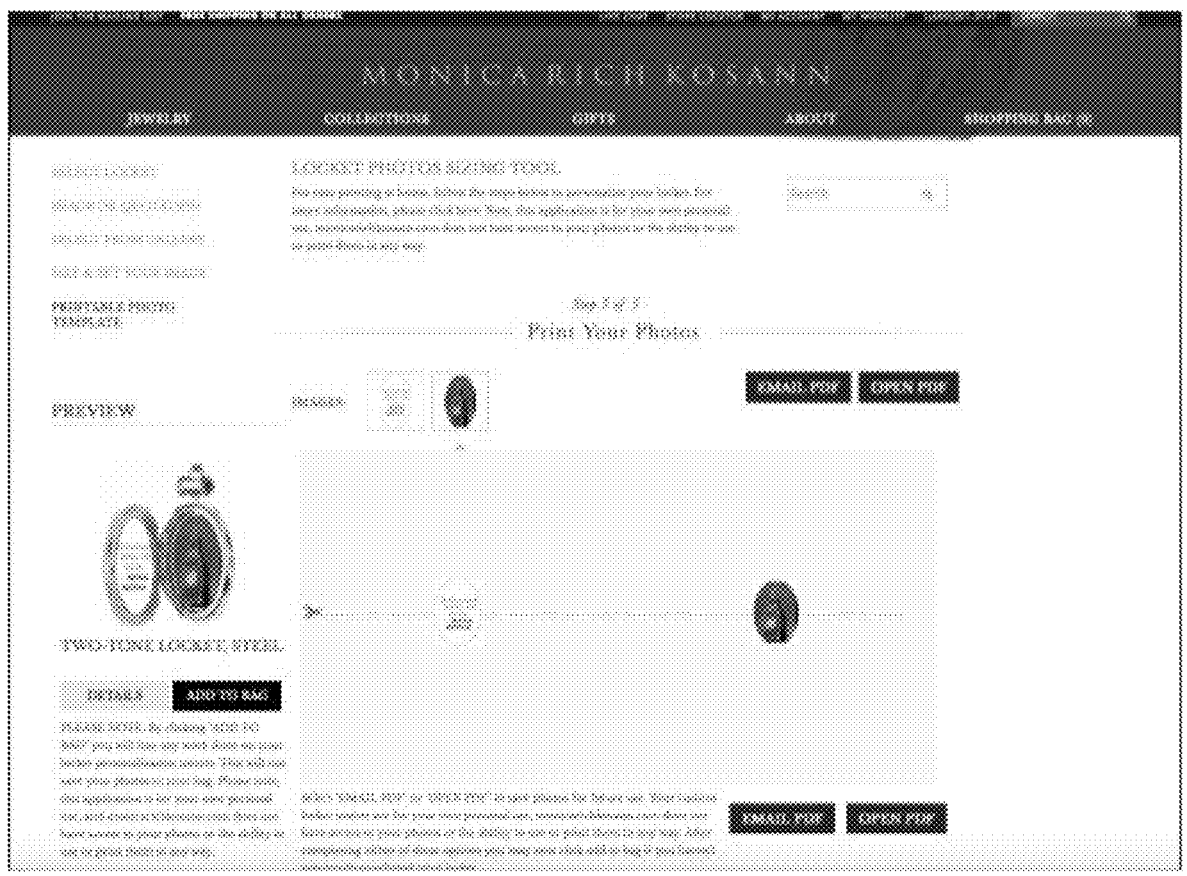
FIG. 13 illustrates a display window showing a print cut layout for a quotation selected form the library of FIG. 11 and for a photo selected from the library of FIG. 9 that have been selected and edited for use with the locket selected in FIG. 2.

FIG. 13 illustrates a locket designed with a combination of indicia from a quotation library selected in block 105 and from an image library selected in block 105.

Figure 14:
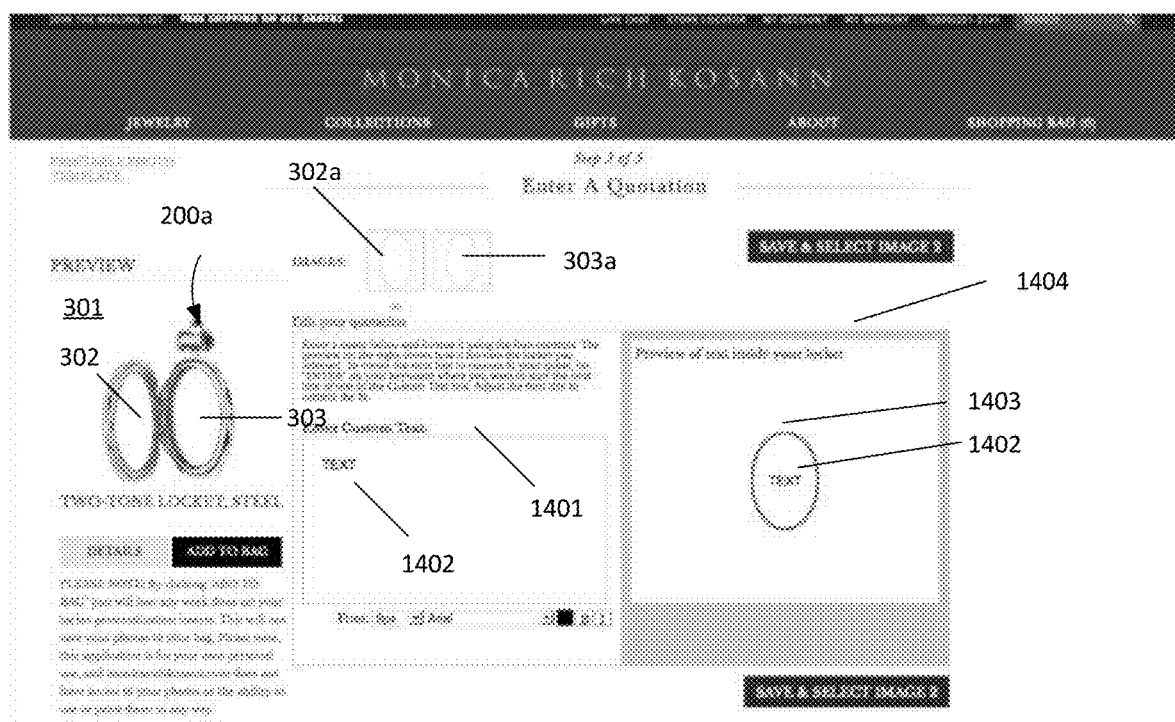
FIG. 14 illustrates a display window for a user to enter user text for use as indicia for the locket selected in FIG. 2.

In addition to quotations or text from libraries, a user can enter his or her own text or quotation at block 106, as shown in FIG. 14. A text window 1401 is provided for user to input text 1401. The text 1401 can be edited and formatted with various fonts, colors, and font sizes. A stencil 1403 is shown in a preview window 1404. The stencil 1403 represents the display areas 302 and 303 of the locket 200a. The input text 1402 is repeated in the region bounded by the stencil 1403 to show the user how the text 1402 would appear in the locket.

Figure 15:
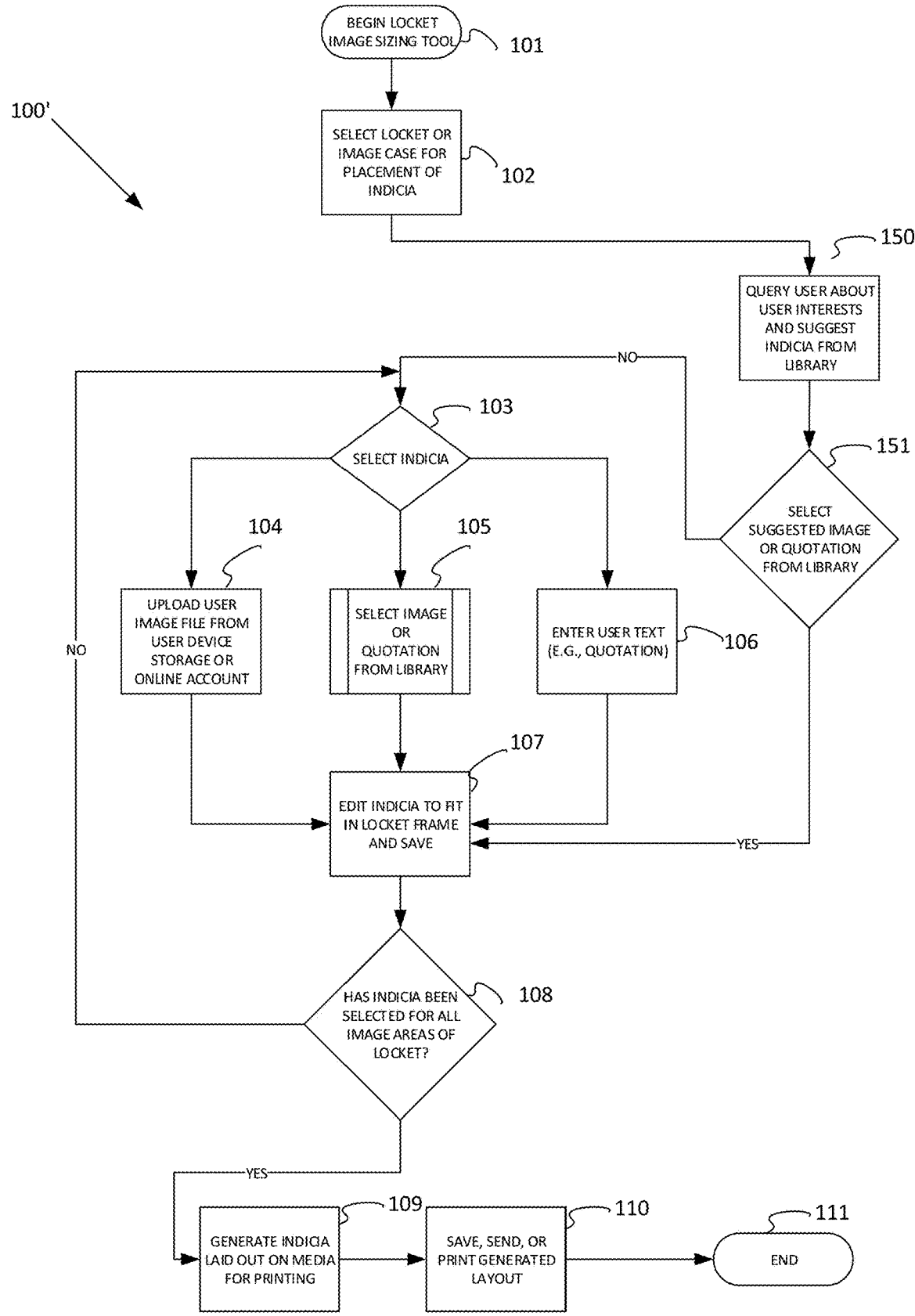
FIG. 15 illustrates an alternative workflow to that shown in FIG. 1.

FIG. 15 shows a workflow 100' that may be used alone or in conjunction with the prior described workflow 100, as one option to select indicia for the jewelry. Accordingly, in the workflow 100' shown in FIG. 15, like numbers are used to represent like elements of the workflow 100. For example, before a user selects indicia in blocks 104 to 106, a user may be queried at block 150. For example, at block 150 user-directed queries related to at least one of lifestyle, passions, and interests are generated and responses to those queries are received from the user. By way of example and not limitation, queries can be directed to the following subjects: bucket list, athletes, travel, history, wedding, fashion, celebrities, food, architecture, sports, art/patterns/textures, tech/typography, animals/pets, gardening, landmarks, natural landmarks, movies/plays, interior design, health and fitness, photography, skylines (famous), quotes, goals, and mantras, zodiac signs, and ideas for unique materials (fabric, pressed flower, finger print).

Further, at block 150, based on the received responses, suggested indicia are presented to the user. For example, based upon the user responses, text (e.g., quotations) and images (e.g., photographs) may be suggested that are determined to appeal to the user based on his or her lifestyle, passions, and interests. The suggested indicia may be organized and presented according the afore-mentioned example list of subjects. At block 151 a user may optionally select one of the suggested indicia for editing at block 107 in the manner described above. If the user does not select one of the suggested indicia, then workflow continues to block 103.

FIG. 16 shows an example of the computing system 1600 that can be used to implement the workflows described herein. The computing system 1600 can be an individual computer system or an arrangement of distributed computer systems. The computer system 1601A includes one or more analysis modules 1603 (a program of computer-executable instructions and associated data) that can be configured to perform various tasks according to some embodiments, such as the tasks described above. To perform these various tasks, an analysis module 1603 executes on one or more processors 1605, which is (or are) connected to one or more storage media 1607. The processor(s) 1605 is (or are) also connected to a network interface 1609 to allow the computer system 1601A to communicate over a data network 1611 with one or more additional computer systems and/or computing systems, such as 1601B, 1601C, and/or 1601D. Note that computer systems 1601B, 1601C and/or 1601D may or may not share the same architecture as computer system 1601A, and may be located in different physical locations. Computer systems 1601B to 1601D may include personal computers, smart phones, and tablets, for example.

The processor 1605 can include at least a microprocessor, microcontroller, processor module or subsystem, programmable integrated circuit, programmable gate array, digital signal processor (DSP), or another control or computing device.

The storage media 1607 can be implemented as one or more non-transitory computer-readable or machine-readable storage media. Note that while in the embodiment of FIG. 16, the storage media 1607 is depicted as within computer system 1601A, in some embodiments, storage media 1607 may be distributed within and/or across multiple internal and/or external enclosures of computing system 1601A and/or additional computing systems. Storage media 1607 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 1603 can be provided on one computer-readable or machine-readable storage medium of the storage media 1607, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 1600 is only one example of a computing system, and that computing system 1600 may have more or fewer components than shown, may combine additional components not depicted in the embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the operations of the workflow described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

Figure 17:
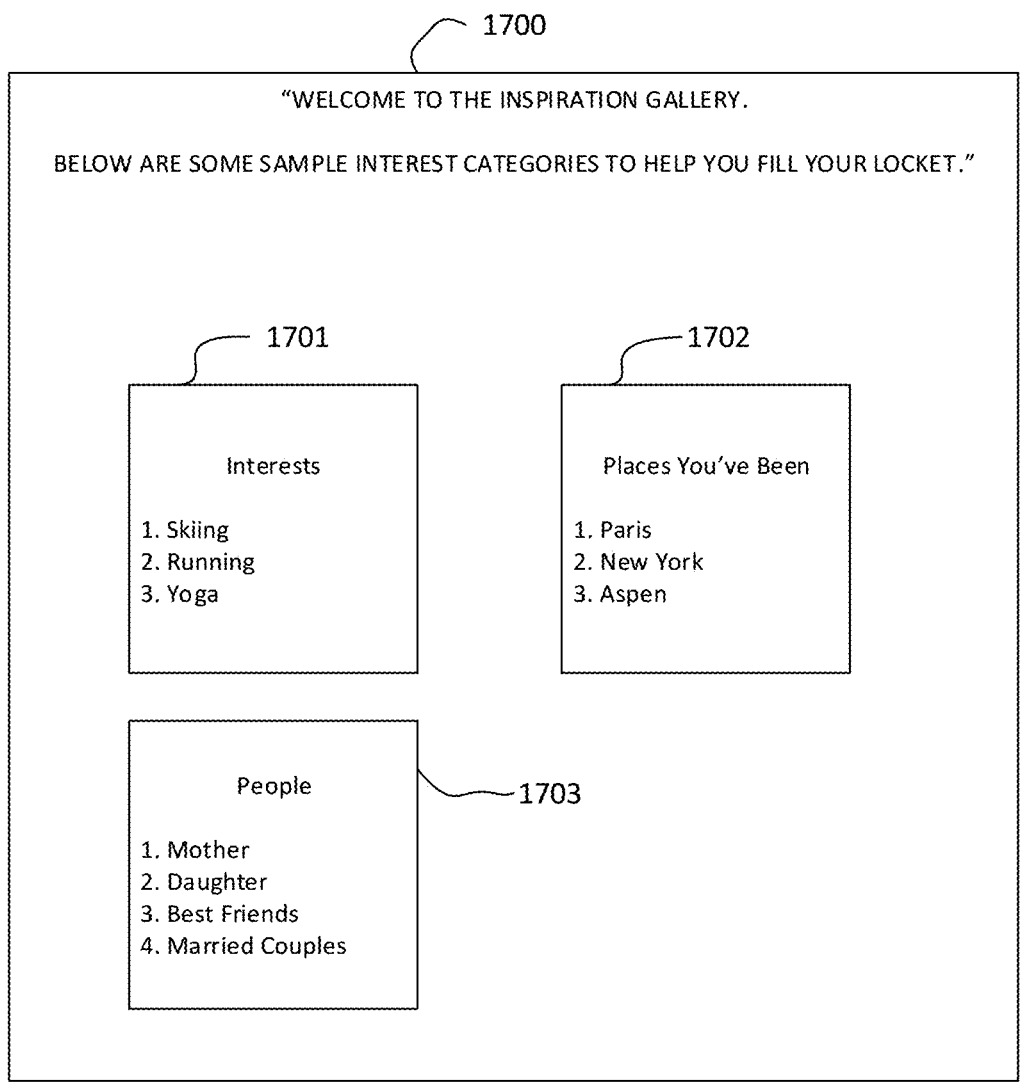
FIG. 17 illustrates an embodiment of an interface for browsing images associated with a user in accordance with an aspect of the disclosure.

FIG. 17 shows a graphical interface embodied as a window 1700, which may be presented to the user of the workflows and systems described above. With regard to the workflows 100 and 100', although the window 1700 may be preferably presented to the user prior to selecting a locket at blocks 102 in the workflows 100 and 100', it will be appreciated that the window 1700 may be presented to a user at any time throughout those workflows, such as in blocks 104 in the workflows 100 and 100' or in block 150 in workflow 100'. Also, the window 1700 may be used independently of the workflows 100 and 100' as a means of browsing images associated with a user, as described in greater detail below.

The window 1700 shows one or more topics which may be relevant to the user and for which the user may have related photos that can be used in the jewelry described above. By way of example, window 1700 includes topic windows 1701, 1702, and 1703, respectively labeled "Interests", "Places You've Been", and "People". Each of the respective topic windows 1701, 1702, and 1703 lists categories of interests, places, and people. In one embodiment, the categories in topic windows 1701, 1702, and 1703 may be populated from accessing a user's social media account (e.g., Facebook®) using an application program interface (API). Alternatively, or additionally, the categories in topic windows 1701, 1702, and 1703 may be populated by accessing a local repository of image data (e.g., a local hard drive connected to the user's device), or a user's networked storage location (i.e., a cloud storage account).

For example, a user opening the window 1700 may be asked whether the user wishes to grant access to one or more of the user's social media accounts (e.g., Facebook®, Instagram®), from which a corresponding social media API can be used to access the user's account data. For example, the Facebook® API may be used to access user Facebook® account information to identify image files associated with the user's account that may be associated with any predefined categories in topic windows 1701, 1702, and 1703 or to dynamically generate the categories displayed in top windows 1701, 1702, and 1703 based on the user's account data.

For example, a user may have taken a recent trip to New York and posted photos taken in New York to the user's social media account. Thus, based on the geotag of the photos, or the location tag that the user manually input, they may be identified as related to the topic "Places You've Been" and the location "New York" may be displayed in the category in window 1702, as shown in FIG. 17.

In one embodiment, the content of one or more photos in a user's social media account may be automatically tagged using an auto-tagging API, such as "imagga" from Imagga Technologies Ltd. Of Sofia, Bulgaria. In addition, predefined rules can be used to associate certain identified tags with related topic windows and categories. For example, a photo in the user's social media account may show the user on a sailboat at a dock in New York and the photo may be processed through an auto-tagging API that tags the example photo with the following tags: "boat"; "sailing"; "New York"; and "user face" through geotags and automatic image recognition. The tags "boat" and "sailing" may be associated by rule with the topic "interests" in topic window 1701, while the tag "New York" may be associated with the topic "Places You've Been" in topic window 1702. Therefore, in the case of the example photo just described, the categories "boat" and "sailing" will be displayed dynamically in topic window 1701 and category "New York" will be displayed dynamically in topic window 1702 based on the results of the auto-tagging API.

In one embodiment, a user may subsequently select (e.g., by mouse click or finger tap) on the categories in windows 1701, 1702, and 1703 as a way of linking to related tagged photos, which the user may then decide to select later to use with the jewelry selected in the workflows described above. Thus, in the example where "New York" is displayed in the topic window 1702, a user may subsequently select "New York" to browse any images tagged as being associated New York. Thus, in at least one embodiment, window 1700 may be accessed by a user to link and browse photos and images associated with the user organized along predetermined topics and categories.

There have been described and illustrated herein several embodiments of a workflow and a system for implementing the workflow. While particular embodiments have been described, it is not intended that the invention be limited thereto, as it is intended that the invention be as broad in scope as the art will allow and that the specification be read likewise. Thus, while particular types of jewelry have been disclosed, it will be appreciated that the workflow may be applicable to other indicia bearing jewelry as well. In addition, while particular types of indicia have been disclosed, it will be understood that other indicia may be displayed as well. For example, and not by way of limitation, insignias, crests, and religious symbols. It will therefore be appreciated by those skilled in the art that yet other modifications could be made to the provided invention without deviating from its spirit and scope as claimed.

What is claimed is:

1. A method for formatting indicia sized for use with jewelry includes:
   selecting a locket jewelry design from among a plurality of locket jewelry designs of different sizes and shapes;
   accessing a user's social media account, the user's social media account having user's digital images;
   selecting indicia for reproduction including selecting one of the digital images;
   editing the selected indicia to fit in a virtual display frame representative of and corresponding to a physical frame of a locket represented by the selected locket jewelry design; and generating a cutout layout of the edited indicia on a printable media of a predetermined size, which when printed, includes a reproduction of the selected indicia sized to fit the locket represented by the selected locket jewelry design.

2. The method according to claim 1, further comprising:
saving, transmitting, or printing the generated cutout layout.

3. The method according to claim 1, wherein:
selecting indicia includes selecting a digital image or text from a user's device including at least one of a smartphone, tablet computer, and personal computer.

4. The method according to claim 1, further comprising:
determining whether indicia has been selected to cover all display areas of one or more virtual display frames; and
if it is determined that indicia has not been selected to cover all display areas of the one or more virtual display frames, repeating the selecting, editing, and generating for the additional indicia to generate a cutout layout of the edited additional indicia to cover any uncovered display areas of the one or more virtual display frames.

5. The method according to claim 4, wherein:
each virtual display frame corresponds to one display area.

6. The method according to claim 1, wherein:
selecting indicia further includes at least one of entering and selecting text.

7. The method according to claim 1, further comprising:
accessing predetermined social media tag data from the user's social media account;
associating predetermined interest categories with the tagged data;
the digital images in user's social media account including user's photos images,
associating user's photo images in the user's social media account with the predetermined social media tagged data and the interest categories; and
graphically presenting the interest categories as selectable graphical links to the user's photo images, wherein the indicia includes the user's photo images.

8. The method according to claim 7, further comprising:
selecting an interest category to access the user's photo images for selection as the indicia for reproduction.

9. The method according to claim 7, wherein:
the predetermined tagged data includes at least one of interests, check-in location, tagged location, friend, and friend relationship.

10. The method according to claim 1, further comprising:
accessing a social media account of a user containing photos;
auto-tagging at least one digital image in the user's social media account to generate one or more tags based on the content of the digital image;
associating the one or more tags with the predetermined categories;
graphically presenting the categories as selectable links to the user's digital images, wherein the indicia includes the user's digital images.

11. The method according to claim 10, further comprising:
selecting a category to access the user's digital images for selection as the indicia for reproduction.

12. A method for formatting indicia sized for use with jewelry includes:
selecting a locket jewelry design from among a plurality of locket jewelry designs of different sizes and shapes;
accessing a user's social media account;
identifying the user's digital images on the user's social media account;
associating the digital images with a plurality of topic categories;
selecting one topic category from the plurality of topic categories;
selecting a digital image from the selected topic category;
editing the digital image to fit in a virtual display frame representative of and corresponding to a physical frame of a locket represented by the selected locket jewelry design; and
generating a cutout layout of the edited indicia on a printable media of a predetermined size, which when printed, includes a reproduction of the selected indicia sized to fit the locket represented by the selected locket jewelry design.

* * * * *